A. W. GRAY.
SYSTEM OF ELECTRIC DISTRIBUTION.
APPLICATION FILED SEPT. 19, 1905.

949,534.

Patented Feb. 15, 1910.

Witnesses:
C. Klostermann.
J. B. Connolly

Inventor:
A. W. Gray.
by
Attorneys.

A. W. GRAY.
SYSTEM OF ELECTRIC DISTRIBUTION.
APPLICATION FILED SEPT. 19, 1905.

949,534.

Patented Feb. 15, 1910.
4 SHEETS—SHEET 4.

Witnesses:

Inventor.
A. W. Gray.
By
Attorneys.

UNITED STATES PATENT OFFICE.

ADELBERT W. GRAY, OF NEW YORK, N. Y.

SYSTEM OF ELECTRIC DISTRIBUTION.

949,534.      Specification of Letters Patent.      Patented Feb. 15, 1910.

Application filed September 19, 1905. Serial No. 279,173.

*To all whom it may concern:*

Be it known that I, ADELBERT W. GRAY, a citizen of the United States of America, residing at New York, in the county of Kings and State of New York, have invented certain new and useful Improvements in Systems of Electric Distribution, of which the following is a specification, reference being had therein to the accompanying drawing.

This invention relates to systems for generating, storing, and distributing electricity, and its primary object is, to utilize the power of the wind to generate electrical energy and control its storage and distribution.

The invention utilizes the power of a wind-mill, or group of wind-mills for operating an electric generator, and it consists of mechanism whereby power is transmitted from the shaft of a wind-mill, or the mechanically-connected shafts of a group of wind-mills, to the shaft of an electrical generator.

The invention further consists in means for automatically regulating the operation of the wind-mills with relation to the capacity of the generator, and storage batteries charged thereby.

The invention comprises novel mechanism, and electrical switches controlled thereby for regulating the supply of current to a series of storage batteries from an electrical generator, said generator being operated by wind power.

The improved mechanism is so constructed as to throw the wind-mill out of the wind when necessary, and also to equalize the power of a series of wind-mills of varying velocity, so that the electrical power generated will not exceed the charging capacity of the storage batteries in circuit with the generator.

The improved system of generation, storage, and distribution, and the construction of the mechanism employed for rendering the same effective will be fully described hereinafter, in connection with the accompanying drawings which form a part of this specification, and their novel features will be defined and set forth in the appended claims.

Figure 4:
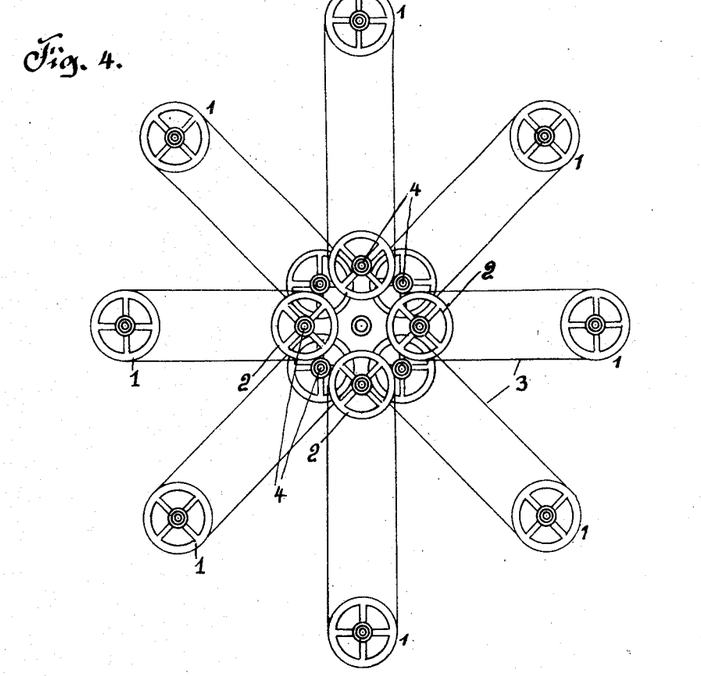
Fig. 4 illustrates diagrammatically a group or nest of windmills connected by gearing to the shaft of an electric generator.

Referring to the accompanying drawings, in Fig. 4 is shown a nest of wind-mills 1 arranged in a cluster and a series of sheaves 2 disposed in annular and staggered relation. Chains or belts 3 are connected to or trained over the sheaves of the wind-mills 1 and the sheaves 2, and said sheaves 2 are mounted upon vertical stub shafts 4 supported in suitable bearings 5. Loosely mounted upon the stub shafts 4 are friction wheels 6 which are operatively driven with said shafts 4 by virtue of adjustably movable clutches 7 adapted to frictionally engage collars 8 rigidly secured to the friction wheels 6. The several friction wheels 6 are arranged in annular and staggered relation and in such arrangement are constantly in frictional engagement with superposed friction or gear wheels 9 mounted upon a stub shaft 10 which is likewise mounted in bearings 5 and has a parallel disposition with relation to said shafts 4. A beveled pinion 11 is also rigidly mounted upon the shaft 10 and is disposed beneath the friction wheels 9. Said pinion 11 is in constant mesh with the beveled pinion 12, which is rigidly mounted upon the end of the horizontally disposed shaft 13, which is the power shaft of the generator.

Figure 1:
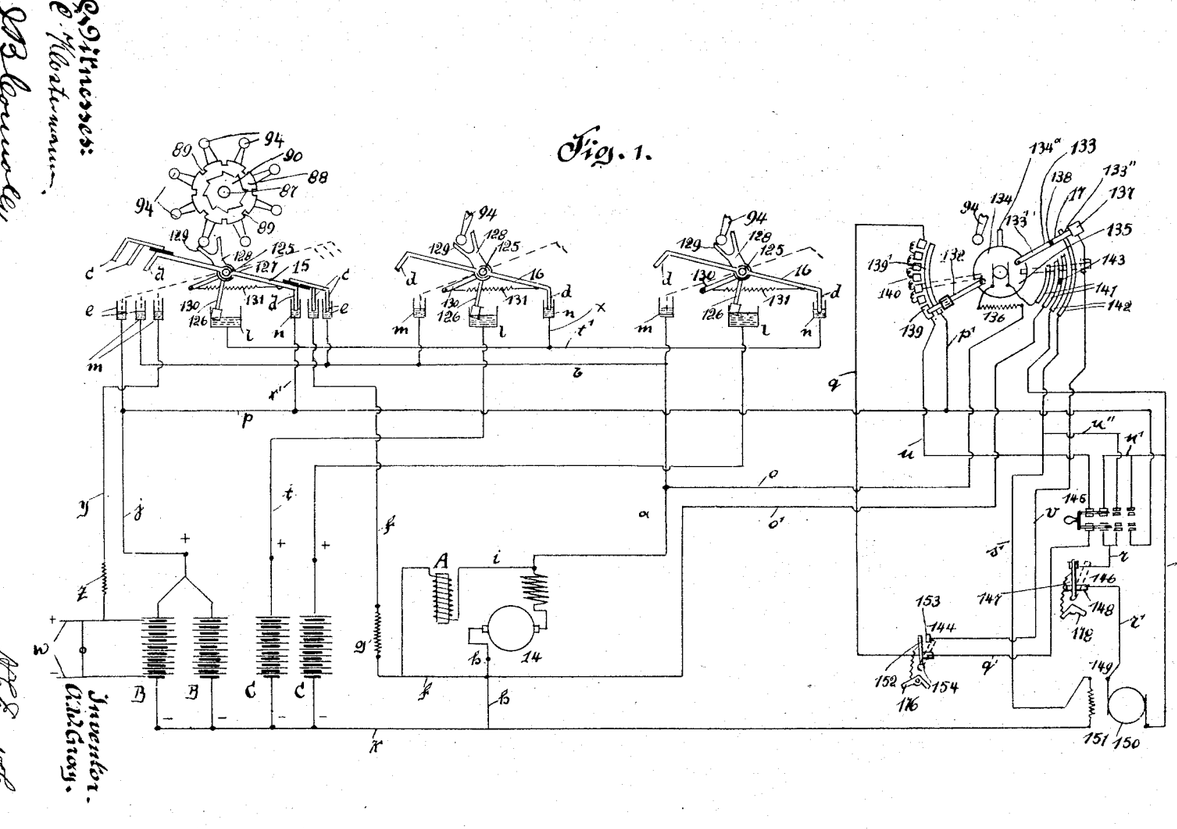
Figure 1 is a diagram illustrating my improved system.
Figure 2:
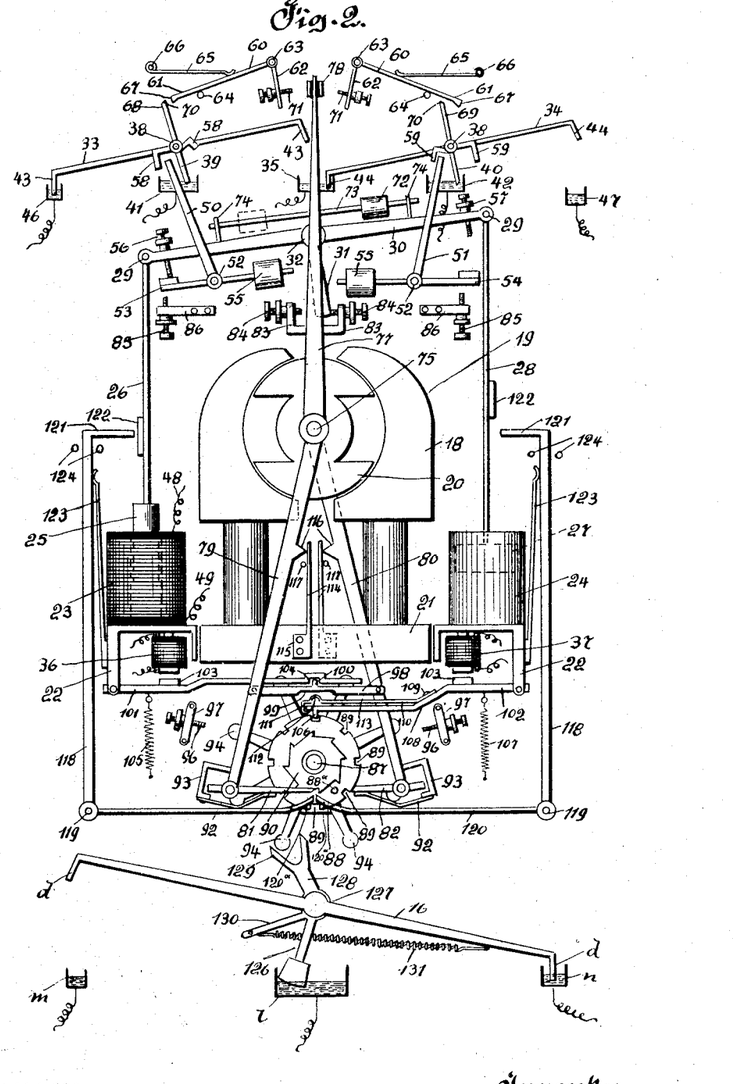
Fig. 2 is a front elevation of a voltage-controlled switch-operating mechanism represented in the diagram of Fig. 1 by the solenoid A.
Figure 3:
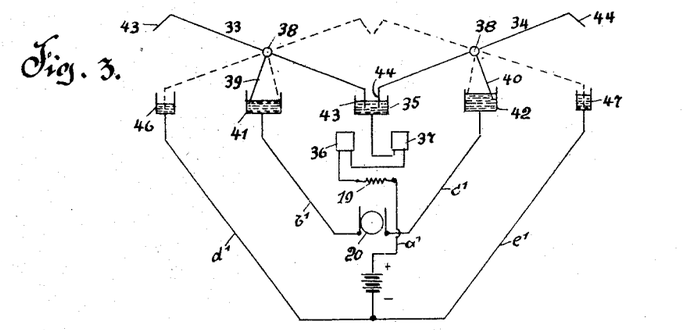
Fig. 3 is a diagram of the current-reversing switches and circuits shown in Fig. 2, the connections of the switch-operating mechanism being shown in their normal operative position.

In Fig. 1 of the drawings 14 represents a generator, $g$ a resistance for building up the field, and A a solenoid device for controlling the operation of the several switches employed; the device A being shown in detail in Fig. 2 and in diagram in Fig. 3.

The several switches of the storage batteries are designated by the numerals 15, 16 and 17, the numeral 15 designating the switch for the main storage battery system, the numeral 16 the switch for the auxiliary storage battery systems, and the numeral 17 the switch for the safety cut-out. The normal positions of the several switches 15, 16 and 17 are shown in full lines, their opposite positions being indicated in dotted lines in Fig. 1 of the drawings. In their "dead" position, the generator 14 is in a circuit traced along the wire $a$ from the positive pole to feed wire $b$ leading to the main storage switch 15, through the shunt circuit contacts $c$ insulated from the storage battery contacts of said switch 15, the mercury cups $e$, the wire $f$ leading therefrom, resistance $g$ interposed in the wire $f$ and wire $h$ leading to the negative pole of the generator 14. The solenoid device for successively tripping the several switches 15, 16 and 17, is in a shunt circuit across the circuit above described with the generator leading from the wire $a$, along wire $i$, back along wire $f$ and wire $h$ to the generator. The switch operating device is shown in its "dead" position in Fig. 3 and in its active position in Fig. 2. It should be here stated that the solenoid device A, is constantly in circuit with the generator, in either position of the switch 15, hence the contacts $c$ and mercury cups $e$ are arranged on each side of said switch and close a circuit with the generator in either position thereof. The first or shunt circuit has been traced. In the live position of the switch 15 indicated by dotted lines in Fig. 1, the circuit follows the wire $b$ as above described, the contacts $c$ and $e$ down along the wire $j$, through the storage batteries and wire $k$ leading therefrom and through the wire $h$ into the generator 14. It is to be noted that the wires $a$ and $h$ at each terminal of the generator are employed in common with the shunt and direct circuits thereof in both positions of the switch 15, so that the solenoid device A which is shunted across either of the generator circuits between the wires $a$ and $h$ by the connecting wires $i$ and $f$, will be constantly in circuit with the generator in either position of the switch 15 so as to render the solenoid device at all times operative during the action of the windmills.

Referring now to Fig. 2, the solenoid device A represented therein in detail, is mounted in a housing, which for the sake of convenience of illustration, is not shown. The switch operating device embodies a motor 18 comprising a stationary field 19 and a rocking armature 20. The motor 18 is mounted upon a support 21, secured to the casing above mentioned. Mounted upon opposite sides of the motor 18 and supported by suitable brackets 22 within said casing is a solenoid 23 and a dash pot 24. The core 25 of the solenoid 23 is rigidly connected to a vertically-extending rod 26, and a plunger 27 moving in said dash pot 24 is in like manner connected to a vertical rod 28. The rods 26 and 28 have pivotal connection at their upper ends as at 29, with a T-shaped lever 30 provided with a depending arm 31. The T-lever 30 is fulcrumed at a central point 32 in suitable bearings provided therefor in the housing above mentioned. The solenoid 23 is in circuit with the generator. The motor 18 may be in circuit with the generator or with the main series of storage batteries. When the various parts are in their normal position in Fig. 1, prior to starting the apparatus, the switch operating device will be in the position shown in Fig. 3, which is the normal position. It is to be noted that the switch operating device embodies auxiliary switches 33 and 34 operated respectively from the solenoid 23 and the dash pot 24. In the position shown in Fig. 3, these switches are in a normal position with their contacts in a common centrally located mercury cup 35. When the switches 33 and 34 are in their normal position the circuit of the source of supply is open, and there being no connection established between said source and the constituent elements of the switch throwing device, the same is, in the above described position of the switches, inoperative, and remains in such inoperative state until either of said switches 33 or 34 is tripped to close the circuit with the source of supply.

As shown in Fig. 3, the circuit is traced from the positive pole of a source of supply, either storage batteries or generator, through the wire $a'$, into the field 19, through magnets 36 and 37 supported beneath the solenoid and dash pot upon the respective brackets 22, into the mercury cup 35 through either of the switches 33 or 34 according to the position thereof, along either of the respective wires $b'$ or $c'$, through the armature 20, and thence from the wires $d'$ or $e'$ leading from said switches 33 and 34 back to the source of supply. It is to be noted that the switches 33 and 34 are of substantially T-shape and are fulcrumed to a central point as at 38, in suitable bearings provided therefor. The switches 33 and 34 adjacent their fulcra 38 are provided with depending arms 39 and 40, which constantly rest in the mercury cups 41 and 42 respectively. Upon the ends of the switches 33 and 34 are provided depending contacts 43 and 44 respectively. The adjacent or main contacts 43 and 44, in the normal position of the switches, rest in the mercury cup 35 but the extreme contacts 43 and 44 rest in mercury cups 46 and 47 respectively. The connections above described are employed in the independent circuits for the solenoid device A, and serve to render said device operative to throw the switches 15, 16 and 17. Since, prior to the starting of the switch throwing device, the solenoid device is in its inoperative position, shown in Fig. 3, the solenoid 23 being in circuit with the generator, must necessarily be energized thereby throwing it in action and drawing its core 25 and the rod 26 connected thereto, thereby rocking the T-arm 30, and in this action moving the switch 33 to the full line position of Fig. 2 and the dotted line position of Fig. 3 at which time, the circuit of the solenoid device will be operative and will be as follows: from the source of supply through the field 19, the magnets 36 and 37, mercury cup 35, the contact 44, the switch 34, the depending arm 40 of said switch 34, the mercury cup 42, the wire $c'$, the armature 20, the wire $b'$, the mercury cup 41, the arm 39, the switch 33, the mercury cup 46, and the wire $d'$ back to the source of supply. The switch 33 in assuming its full line position to establish the circuit above described, is operated by devices which will be described in detail. Similar devices are also provided in establishing the circuit through the switch 34, and will be described in conjunction with the devices for establishing the circuit through the switch 33. It should be here stated that the switch 33 closes the circuit when the current passing through the solenoid is of sufficient voltage to operate the switch, and that the switch 34 closes the circuit when the current in the solenoid is less than is sufficient to energize the solenoid so that the weighted plunger 27 shall have free movement in the dash pot, at which time the action will be the same as the action of the parts operated from the solenoid, but will tend to move the motor 18 in a reverse direction, so as to break or throw into the normal position in Fig. 1, the several switches 15, 16 and 17.

The respective switches 33 and 34 are tripped in either direction by horse shoe magnets 50 and 51 which are centrally pivoted as at 52, to arms 53 and 54 provided on their inner ends with adjustably movable weights 55. The arms 53 and 54 are adapted to be engaged by adjustable pins 56 and 57 carried by the T-arm 30. The pins 56 and 57 are employed to engage the ends of the respective arms 53 and 54 of the magnets 50 and 51 and to swing said magnets upon their fulcra 52 in either direction to control the movement of the switches 33 and 34. In their rocking movement, the magnets act to trip said switches by virtue of their influence over depending armatures 58 of the switch 33, one arm being exposed on each side of the fulcrum 38 thereof, and depending armatures 59 of the switch 34, said last named arms being disposed in a similar manner to the armatures 58. As either of the magnets 50 or 51 is swung upon its fulcrum 52 to a position off center, its influence upon the adjacent armature 58 or 59 of the switches 33 and 34, will be to trip said switches in either direction according to the direction of the movement of the magnets 50 and 51 as controlled by the pins 56 and 57 engaging the arms 53 and 54 of said magnets. The action of the switches 33, 34 in their movement may be further facilitated by the provision of a spring in the manner of a snap switch. It is to be noted in Fig. 2 that the switch 33 is in its working position, as indicated in dotted lines in Fig. 3. When in this position, either of the switches 33 or 34 is locked by means of pivoted L-shaped detents 60 each provided with a lateral arm 61 and a depending arm 62. The detents 60 are fulcrumed at the junction of the arms 61 and 62, as at 63 in bearings provided therefor in the casing. The pivotal movement of the detents is limited by pins 64 disposed adjacent the arms 61, and said detents are held normally against said pins through the agency of springs 65 which may be of any desired form but are shown as flat springs rigidly connected as at 66 to the casing or to a pin projecting therefrom. The ends of the arms 61 are formed with an inclined shoulder 67.

The switches 33 and 34 are provided near their fulcra 38 and in alinement with the arms 39, with upwardly extending arms 68 and 69 which are formed at their extremities with inclined faces 70. Mounted in the depending arms 62 of the detents 60 are pins 71, the function of which will be presently described. It should be here stated that when either of the switches 33 or 34 is swung into a "working" position as shown in the case of the switch 33, the arm 68 or 69 with its inclined face 70 will ride over the adjacent inclined shoulder 67 mounted upon the end of the arm 61 of said detent, forcing the same upwardly against the action of the spring 65, until said arm 68 or 69 shall have cleared said detent at which time the spring 65 will restore the detent to its initial position and lock the switch. In order to facilitate the movement of the rocking T-arm in either direction, I have provided the weight 72 which is slidably mounted upon a rod 73 transversely journaled in bearings 74 projecting from the T-arm 30. The gravitating action of this weight will tend to accelerate the speed of the arm 30 in either direction.

The structure above described relates to the mechanism of the solenoid switch throwing device A, and when the switch 33 or 34 has been tripped, the circuit is thus established through the medium of certain elements to be described, to throw the switch arms 15, 16 and 17 in either direction according to the position of the switches 33 or 34.

Rigidly mounted upon the motor shaft 75, is an upwardly extending arm 77, approximately vertically disposed in the "dead" position, said arm 77 being provided adjacent its upper end with an insulating block 78.

Rigidly mounted upon the motor shaft adjacent the ends of the armature 20 are oppositely extending arms 79 and 80 which pass upon the outside of the support 21 for the motor 18. Pivoted to the lower ends of the arms 79 and 80 are pawls 81 and 82 respectively which extend inwardly or toward each other. The arm 77 carries upon the lower portion thereof, laterally extending brackets 83 disposed one on each side of said arm and in said brackets are adjustably mounted screws 84 against which the depending arm 31 of the rocking T-lever 30 is adapted to abut for a purpose to be hereinafter described. It should be here stated that said arm 31 has its termination at a point between said brackets 83.

In order to limit the movement of the arms 53 and 54 of the magnets 50 and 51, I have provided adjustable screws 85 which are mounted in brackets 86 secured to the housing and which are adapted to impinge against the under faces of the arms 53 and 54.

Rigidly mounted upon a rotatable shaft 87 and disposed between the arms 79 and 80 is a drum 88 which is approximately centrally located upon said shaft between said arms. This drum is formed with a series of peripheral recesses 89 for the purpose hereinafter described. Rigidly mounted upon said shaft 87 and disposed on each side of said drum 88 are ratchets 90 and 91, the teeth of which extend in opposite directions and are adapted to be engaged respectively by the pawls 81 and 82 fulcrumed upon the ends of the arms 79 and 80. Said pawls 81 and 82 are retained in engagement with said ratchets 90 and 91 by means of flat springs 92 which bear at one end against said pawls and are secured at their other ends rigidly to L-shaped depending extensions 93 carried by the levers 79 and 80. Rigidly mounted upon the shaft 87 and shown as disposed adjacent to the ratchet 91 are a series of radially extending and spirally arranged arms 94 adjustably secured upon said shaft by screws 95. The movement of the arms 79 and 80 is controlled by the movement of the armature 20 but is limited by means of pins 96 adjustably mounted in brackets 97 secured to the casing. The arms 79 and 80 are connected by a bridge piece 98 which is formed on its under face with a central recess 99 and on its upper face with a centrally located stud 100. Fulcrumed in the depending legs of the brackets 22 upon which the solenoid 23 and the dash pot 24 are supported, are levers 101 and 102 which are adapted upon the establishing of either of the circuits of the motor 18, to be engaged and held by the respective magnets 36 and 37, but which, when said motor circuit is opened as is shown in Fig. 3, are adapted to be released by said magnets to assume a position to be hereinafter described. The levers 101 and 102 carry armatures 103 to be attracted by said magnets and each of said levers is of peculiar construction and will be separately described in detail. The lever 101 is formed adjacent its inner end with a recess 104 adapted to fit over the stud 100 of the bridge member 98 and said lever is held in position upon said bridge member by means of a spiral spring 105 and in the position just described, is designed to hold the arms 79 and 80 from movement in either direction by virtue of its locking engagement with the stud 100. The lever 102 is formed adjacent its free end with a depending stud 106 which is adapted to rest in any one of the recesses 89 in the drum 88. The lever 102 is held in its position by a spring 107 secured to the housing and to the lever in the same manner as the spring 105, and said lever is formed with a centrally located inclined portion 108 to which is rigidly secured as at 109, the end of a leaf spring 110. The spring 110 is formed with a hooked end 111 adapted to embrace the extremity of the lever 102 and adjacent said hooked end 111, said spring 110 is formed with a teat 112, which normally occupies the space between the walls of the recess 99. Said teat 112 is formed with a curved surface and is adapted upon the movement of the arms 79 and 80 to impinge against the flat surface 113 of the bridge piece 98 on either side of the recess 99.

For the purpose of accelerating the restoration of the arms 79 and 80 to initial position, I have provided leaf springs 114 which are secured at their ends to each side of the support 21 of the motor 20. Said springs 114 impinge against integral lateral extensions 116 carried upon each of the arms 79 and 80 and are limited in their action by stub pins 117 extending from a suitable support.

For the purpose of temporarily locking the rods 26 or 28 when the solenoid 23 and dash pot 24 have performed their respective functions, I have provided L-shaped latches 118 arranged adjacent said rods, and fulcrumed at their lower ends as at 119 in bearings provided therefor. Leaf springs 120 are rigidly secured to the latches 118 at their bases and extend inwardly toward each other, said leaf springs being formed with upwardly inclined ends 120ª. The latches 118 are each formed with a bent end 121 adapted to engage an abutment 122 carried by the rods 26 and 28. The drum 88 is formed on its side adjacent said springs 120 with a laterally extending pin 88ª. When the drum 88 completes its movement in either direction after all the switches 15, 16 and 17 have been tripped, the pin 88ª will engage the inclined end 120ª of the corresponding spring 120, thereby depressing the latter and swinging the latch 118 upon its fulcrum 119 until the latter passes beneath the abutment 122 upon either of the rods 26 or 28, thereby locking the same against the hammering of the solenoid 23 or dash pot 24 after the switches 15, 16 and 17 have been severally set in either position, and maintaining the parts locked during the period that the drum 88 remains stationary at the termination of its movement in either direction. It is to be noted that when one rod 26 or 28 is locked, the other of said rods will be free to move, when the potential of the generator correspondingly increases or decreases, and as soon as the drum 88 is given a single impulse in the direction of travel opposite to that just completed, the spring 120 is released from its position against the pin 88ª. When said levers 79 and 80 are restored to initial position, the spring 120, will, by its own resiliency return to its normal position, and the latches 118 will be quickly restored to normal disengaged position by virtue of leaf springs 123 bearing thereagainst and secured to said brackets 22. The movement of the latches 118 in either direction is limited by stop pins 124 disposed on each side thereof.

It should here be noted that any number of series of storage batteries may be employed, hence a corresponding number of switches. I have shown in Fig. 1, three series of storage batteries and three switches, but as in the drawing, the solenoid switch working device is capable of successively tripping eight switches to close various circuits and of successively tripping said switches in a reverse direction to open said circuits. It will be apparent that the various switch controlling elements must correspond in number to the number of storage batteries to be charged. As each of the arms 94 engages and operates on one of the switches there will be eight of said arms. As the movement of each arm is dependent upon the engagement of one of the pawls 81 or 82 with one of the teeth of the ratchets 90 or 91, said ratchet will hence be formed with eight ratchet teeth, and inasmuch as the drum 88 is locked after each actuation of the levers 79 and 80, and the pawls 81 and 82 connected therewith, it will be apparent that said drum will be formed with eight peripheral teeth.

The several switches 15 and 16 are of similar and peculiar construction. It is to be noted that the switch 15 carries the contacts $c$ which are arranged in pairs in each end thereof and are insulated from the storage battery contacts $d$. Said switches are of substantially T-shape and the switches 16 are provided at each end with the single storage battery contact $d$. Each of the switches 15 and 16 is fulcrumed at a certain point as at 125, and adjacent said fulcrum are formed with a depending arm 126 which rests in a mercury cup $l$ thereby constituting a contact whereby provision is made so that the generator is always in circuit with the batteries or resistance $g$. The several contacts $d$ are adapted to rest in mercury cups $m$ in their live position, and in cups $n$ in their "dead" position. These contacts possess the same spaced disposition as the arms 94 mounted upon the shaft 87, and hence said switches 15, 16 and 17 are fulcrumed upon a common shaft 127, but mounted so as to be independently rotatable thereupon. Said shaft 127 bears spaced parallel relation to the shaft 87 previously described, and the relative arrangement of said shaft, said arms 94 and said switches is shown in Fig. 2. Loosely mounted upon said shaft 127 are a series of arms 128 provided with bifurcated ends 129 and adjacent their lower extremities with extensions 130. The arms 128 are severally disposed adjacent the respective switches 15 and 16 and are connected therewith by means of spiral springs 131 secured to the extension 130, and to the body of the switches 15 and 16. The switch 17 is of peculiar construction and differs in this particular from the switches 15 and 16 and will be hereinafter more fully described in detail. Said switch 17, is, however, like the switches 15 and 16 mounted upon the shaft 127. The arms 94 are adapted to enter between the bifurcations 129 of the arm 128, and to trip said arm off center so that the extension 130 will be thrown into such a position with relation to the switches 15 and 16 that the spring 131 will act to throw said switch in either direction depending upon the movement of the arm 128 as controlled by the arms 94.

The switch 17 embodies a pair of oppositely disposed arms 132 and 133 mounted upon an armature 134 of a motor 135, the field thereof being designated by the numeral 136 and being shown diagrammatically in Fig. 1. The arm 133 rests at its extremity on a stationary contact 137 and a short distance from said extremity is insulated from the major portion thereof as at 138. The arm 132 of the motor is made heavy to turn the armature of the motor in the reverse direction to which the armature turns when the motor is energized. Said switch 17 is tripped by the engagement of an arm 94 with an upwardly extending pin 134ª and is adapted to close a number of circuits to be more fully described hereinafter from the storage battery and the generator through a stationary contact 139 disposed adjacent the arm 132 and a rheostat 140 disposed adjacent said arm, said contact 139 having circuit connection through the arm 132 by means of a stationary contact 139' arranged adjacent thereto, and through insulated pairs of contact members 141 and 142 said pairs of contact members 141 and 142 being separated by the insulation 143. The major portion 133' of the arm 133 is designed to close the circuit with the contacts 141. The extremity 133'' of the arm 133 is designed to close the circuit through the contacts 142.

As shown, the switch 17 and the various switches in circuits depending thereon are in an inoperative or "dead" position, but when said switch is tripped by the arm 94 into the position shown by dotted lines, the following circuits are established viz: a generator circuit, and a storage battery circuit to switch motor 134, and a storage battery circuit, and also a generator circuit through rheostat 140, to motor 150. The generator circuit leads along the wire $a$; branches to wire $o$ through which it passes to the field 136 and armature 134 of the motor 135, thence through the contact 141 and portion 133' of the arm 133, to wire $o'$ back to the generator through the wire $h$. It will thus be seen that the generator current will act upon the motor 134 to swing the switch 17 along the rheostat 140, which is in the storage battery circuit.

The storage battery circuit is as follows: from the main series of storage batteries B, through the wires $j$, the wires $p$ and $p'$, through contact 139', arm 132, rheostat 140, wire $q$, contact 144, wire $q'$ (which is connected with wire $q$ by the contact 144) through contacts and one blade of a hand switch 145, to the wire $r$ through short length contact 146, a snap switch 147 contact 148, wire $r'$ to motor 149, armature 150, wire $s$, to contact 142, the portion 133'' of the switch 17 through wire $s'$ from the outer contact 142, field 151 and along the wire $h$ back to the battery B. The battery circuit through the rheostat 140 to the motor 150 has been referred to, and there is also a circuit to the motor from the generator through the switch 15, and wire $p$. In the circuit from the rheostat to the motor 150 is an automatic snap switch 152, which has a long contact piece 144 at one terminal and a short length contact 153 at the other terminal, said snap switch 152 being pivoted on its base as at 154. The switch 147 which acts with the contacts 146 and 148, is a counterpart in construction to the switch 152. It should be here stated that when the various parts are in the "dead" position, as shown in full lines in Fig. 1, or one of the switches 15 and 16 has been thrown into the "live" position as indicated in dotted lines Fig. 1, and the switch 17 has been thrown into its "live" position, the switch 152 is always open and the switch 147 is always closed.

Figures 5, 6, 7:
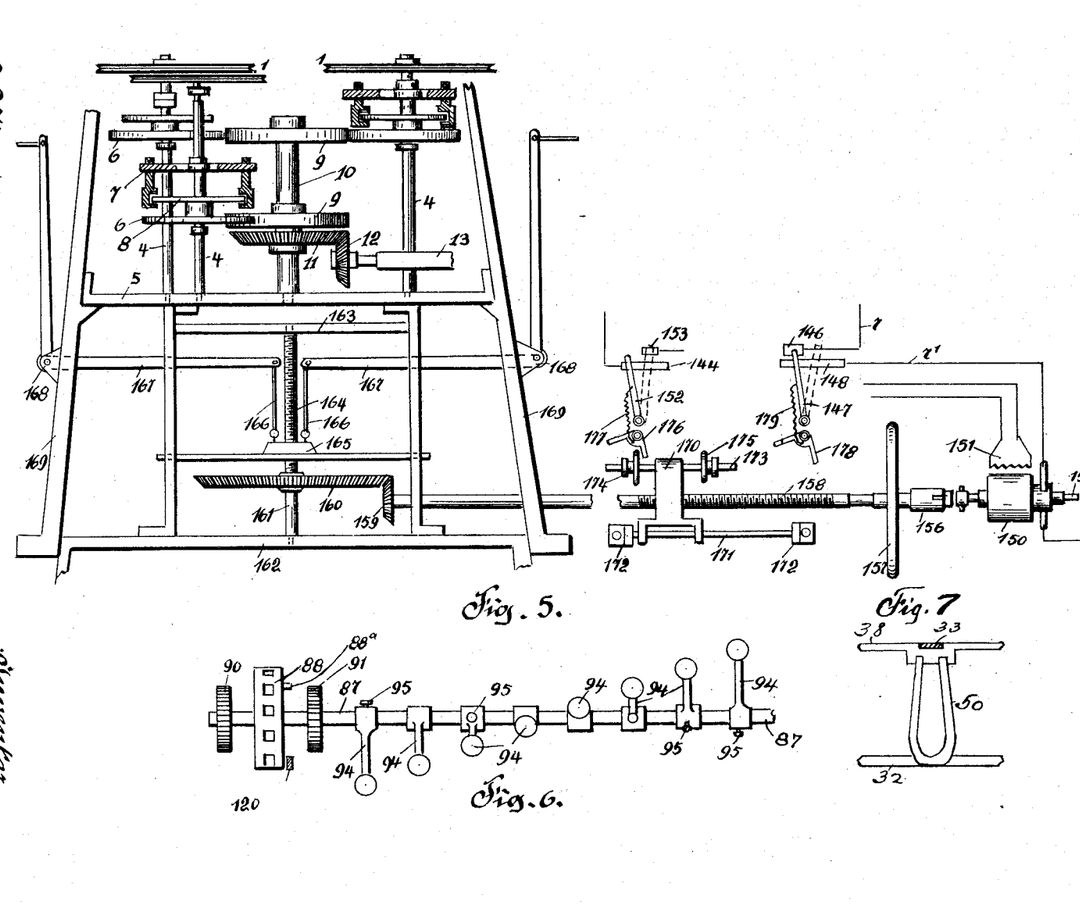
Fig. 5 is a side elevation of a safety device employed in connection with the gearing interposed between the wind-mills and the generator shaft.
Fig. 6 is a detail front elevation of a plurality of arms for throwing the storage battery switches, a shaft upon which the arms are mounted, and its connections.
Fig. 7 is a fragmentary detail view of a portion of the mechanism shown in Fig. 2.

In connection with the safety device we will now refer specifically to Fig. 5. It is to be noted in this figure that the switches 152 are in the position intimated above under the conditions described. The power shaft 155 of the motor 150 has rigid connection with the shaft 156 carrying a hand wheel 157, said shaft being formed along the major portion of its length with threads 158. Mounted upon the end of the shaft 156 is a beveled pinion 159 which is constantly in mesh with a beveled gear 160, mounted upon a vertical shaft 161, supported in bearings 162 and 163. Said shaft 161 is formed along the major portion thereof with threads 164 upon which is adapted to travel a concentrically arranged collar 165 which is internally threaded to intermesh with the threads 164. The collar 165 has flexible connection through the agency of connecting wires or rods 166 with bell cranks 167 pivotally mounted at the junction of their legs as at 168 inside braces 169 upon which the support 5 for the various gearing shafts of the wind-mills is also mounted.

The bell cranks 167 are connected in any desired manner to the pivotally mounted wheel of the wind-mill so that as the collar 165 moves upon the threaded portion 164 of the shaft 161, the bell cranks 167 will be moved, and through the connections thereof will serve to move said wind wheel upon its fulcrum, so that said wheel may be by the movement of the collar 165 extended so as to lie at an angle to the wind, as in the normal position, or it may be moved so as to be drawn out of the wind. This action occurs when the potential from the generator enters the armature of the motor 150 through the wire $r'$, and rotates the shaft 156 connected to the power shaft 155 of shaft motor in such a direction, that the shaft 161 driven thereby through the medium of the connecting gears 160 and 159, will feed the collar 165 downwardly, to draw the blades of the wind-mills out of the wind, and hence reduce the speed of the generator 14. This is the first step or action in the operation of the safety device. Simultaneously with the foregoing step in the operation, the switch 152 is tripped to close a circuit which passes through the contact 153, switch 152, and contact 144 by the following devices. A support or bracket 170 is slidably mounted upon a transversely-disposed rod 171 which is held in brackets 172 at each end thereof. Said bracket 170 is internally threaded so as to allow the threaded portion of the shaft 158 to pass therethrough and intermesh with the threads thereof. A transverse rod 173 is mounted in the upper end of said bracket 170, said transverse rod 173 carrying at its ends collars 174 and 175. As the collar 165 is being fed downwardly the bracket 170 is being fed upon the shaft 156 along its bearing 171 toward the motor. The collar 174 in the course of a travel of the bracket 170 in the direction above named, will engage a pivoted bell crank 176 and swing the same upon its fulcrum. Said bell crank 176 is connected by a retractile spring 177 with the switch arm 152, so that when the bell crank is swung to a point off center, the spring 177 will act to draw said switch arm 152 into the dotted line position Figs. 1 and 5 and close the circuit previously described between the contacts 153 and 144. This is the second step in the operation of the safety device, and occurs simultaneously with the downward movement of the collar 165. The operation of the safety device may stop at this point, since the potential of the generator is materially decreased owing to the wheels of the wind-mills being drawn out of the wind as described so that should the potential of the generator decrease to a sufficient degree, the switch 17 will return to its normal position indicated in full lines in Fig. 1, by the decrease in the current from the generator and the reverse movement imparted to the armature of the motor by the weight of the arm 132. However, when the switch 17 returns to this position after the first step in the operation of the safety device, a different state of action is presented from that when the switch was originally in full line position prior to the action of the safety device. This is due to the fact that the circuit controlled by the contacts 153 and 144 and switch 152 has been closed. This circuit is a storage battery circuit and is traced from the main battery B along wire $p$, wire $p'$, switch arm 132, contact 139, wire —$u$—, through the blade of manual switch 145, wire —$u'$—; through wire —$s$—, entering motor 149 from an opposite direction to the storage battery current through rheostat, from motor 149 over wire —$r'$—, switch 147, back through switch 145, wire $q'$ to contact 144, through switch arm 152 and contact 153, wire —$v$—, through contact 137, portion 133″ of switch arm 133, through outer contact 142 over wire $s'$, through field 151 and over wire —$k$— back to generator. The operation of the motor 150 through the storage battery circuit takes place only when the potential of the generator is decreased owing to the wheels of the wind mills being drawn out of the wind. Should there be a very powerful wind, and should the potential of the storage batteries be so great as to continue their influence upon the motor 134 thereby maintaining the rheostat storage battery circuit closed, the motor 150 will operate to feed the bracket 170 the entire length of the threaded portion until the collar 175 engages the pivoted bell crank 178 which is connected to the switch 147 by a spring 179. When the bell crank 178 is swung upon its fulcrum, the switch arm 147 will be thrown over by the spring 179, thereby breaking the circuits which pass through the contacts 146, arm 147 and contact 148, and stopping the motor 149 so as to prevent the displacement of the various parts from their bearings. When this occurs, the switch 17 assumes its normal full line position, and the various switches 15 and 16 will be in a dotted line position, the storage batteries dependent thereupon having been all charged. Feed wires $w$ lead from the main storage battery B to any desirable electrical system that may be installed.

Assuming that the potential of the generator has decreased either through the natural falling of the wind or through the action of the safety device above described, in moving the blades of the wind-mills out of the wind, the solenoid device A for operating the several switches 15 and 16 now comes into action again, but in the reverse direction, the arm 80 being actuated to set the switches 15 and 16 back to their full line position in a manner to be hereinafter described. When the switches have been restored to their normal position, the main series of storage batteries B are fed from the auxiliary batteries along the wire $t$, through the mercury cups $l$, switch arm 16, contact $d$, mercury cups $n$, along wire $x$, through the mercury cup $l$ of switch 15, contact $d$ and cup $n$ of said switch, through the wire $x'$ leading from cup $n$, along the wire $p$, wire $j$, through the batteries B, back along wire $k$ to the storage batteries C.

In connection with the general system involved it should be here stated after the action of the safety device when the switch arms 152 and 147 have been thrown in dotted line position, in resetting the switches the arm 147 is moved manually to complete the circuits through the contacts 146 and 148 thereby establishing the storage battery circuit through the device 17 and the contact 139 at which time the motor 150 will revolve in the proper direction to feed the bracket 170 away therefrom and through the medium of the collar 174 trip the switch 152 to break the storage battery circuit through contact 139 thereby stopping the motor 149 and resetting the various parts. This operation may be also accomplished manually in the event of the potential of the storage batteries being exhausted by disconnecting the shaft 156 from the power shaft 155 and rotating said shaft 156 with the hand wheel 157. Should it be desired to stop the motor 150 before the action of the safety device reaches the arm 147, the hand switch 145 is thrown to the right (Fig. 1)

to break the circuit between the wires $u$ and $u'$, and $q'$ and $r$. The circuit established to reverse the motor and shut down the wind mills, is from the battery B along wire $p$ through one blade of hand switch 145 to wire $r$, through snap switch 147, wire $r'$, motor 149, wire $s$, wire $u'$, through the other blade of switch 145, wire $u''$, wire $s'$, through field 151, and over wire $k$ back to battery B.

Having now described my invention, what I claim as new is:

1. The combination with a wind mill, of an electric generator having its shaft mechanically connected to the wind-mill shaft, a storage battery electrically connected to said generator, electric switches in the storage battery circuit, means controlled by the potential of said generator for tripping said switches and an electrically-controlled safety device for regulating the operation of said wind-mill with relation to the storage capacity of said battery.

2. The combination with a wind-mill, of an electric generator having its shaft mechanically connected to the wind-mill shaft, a storage battery electrically connected to said generator, electric switches in the storage battery circuit, means controlled by the potential of said generator for tripping said switches, and electrically-controlled means for throwing said wind-mill out of the wind.

3. The combination with a wind-mill, and an electric generator mechanically connected thereto, of a series of storage batteries electrically connected with said generator, switches in the storage battery circuits for controlling the supply of current to the batteries and means controlled by the potential of the generator for operating said switches, and electrical means for automatically regulating the operation of said wind-mill with relation to the storage capacity of said batteries.

4. In combination with a generator and means for furnishing power of varying degrees to drive the same, a system of electrical distribution therefor embodying a plurality of series of storage batteries each in a separate branch of a circuit leading through said generator, switches interposed in said storage battery circuits, one of said switches being constantly in circuit with said generator in both positions thereof, means controlled by the potential of said generator at a predetermined degree for operating said switches to close said storage battery circuits, and means controlled by the potential of said generator at a degree lower than the degree set for the actuation of said first named means to operate said switches to break said storage battery circuits.

5. In combination with a generator and means for furnishing power of varying degrees to drive the same, a system of electrical distribution therefor embodying a plurality of series of storage batteries in parallel circuit with one another and all in direct circuit with said generator, switches interposed in said storage battery circuits, means controlled by the potential of the generator for successively throwing the switches of the storage battery circuits into position to close said circuits, and means controlled by the potential of the generator for successively throwing said switches into position to break said storage battery circuits under predetermined conditions.

6. The combination with a generator and means for furnishing power of varying degrees to drive the same, a system of electrical distribution therefor embodying a plurality of series of storage batteries in parallel circuit with one another and each in series circuit with the generator, switches severally interposed in said storage battery circuits, means controlled by the potential of the generator for successively tripping said switches to close said storage battery circuits, and means controlled by the potential of the generator for successively tripping said switches to break said storage battery circuits under predetermined conditions, one of said switches being constantly in circuit with the generator in either position with relation to the storage battery circuits.

7. In combination with a generator and means for furnishing power of changeable degree to drive the same, a system of electrical distribution therefor embodying a plurality of series of storage batteries in parallel circuit with one another and each in series circuit with said generator, feed wires leading from said storage batteries, switches severally interposed in the storage battery circuits, means controlled by the potential of the generator at predetermined degree for successively tripping said switches to close said storage battery circuits, and means controlled by the potential of the generator at a degree below the degree of actuation of said first named means for successively tripping said switches to break said storage battery circuits, one of said switches being constantly in circuit with the generator in either the make or break position with relation to said storage battery circuits.

8. In combination with a generator and means for furnishing power of changeable degree to drive the same, a system of electrical distribution therefor, embodying a plurality of series of storage batteries in parallel circuit with one another and all in circuit with the generator, feed wires leading from said storage batteries, switches severally interposed in circuit with the generator and storage batteries, electrical means controlled by the potential of the generator for tripping said switches to close said storage battery circuits, and mechanical means controlled by the potential of the generator for tripping said switches to break said storage battery circuits, one of said switches being adapted to close a circuit with the generator in either its make or break position with relation to said storage battery circuits.

9. In combination with a generator, and means for furnishing power of changeable degree to drive the same, a system of electrical distribution therefor embodying a plurality of series of storage batteries in separate circuits with said generator, wires leading from said storage batteries, switches severally interposed in storage battery circuits with the generator, electrical means controlled by the potential of the generator at a predetermined degree for tripping said switches to close said storage battery circuits, mechanical means controlled by the potential of the generator at degrees less than the degree of actuation of said first named means for tripping said switches to break said storage battery circuits, with the generator one of said switches being adapted to close the circuit between the generator in either its make or break position with relation to said storage battery circuits.

10. In combination with the generator and means for furnishing power of changeable degree for driving the same, a system of electrical distribution therefor embodying a plurality of series of storage batteries in separate series circuits with the generator, switches severally interposed in the storage battery circuits, feed wires leading from said storage batteries, electrical means controlled by the potential of the generator at a predetermined degree for successively tripping the several switches to close the storage battery circuits, and mechanical means controlled by the potential of the generator at degrees less than the degree of actuation of said first named electrical means for successively tripping the several switches to break said storage battery circuits with the generator, one of said switches being designed to close a circuit with the generator in either its make or break position, with relation to said storage battery circuits.

11. In combination with a generator, wind-mill power supply and a system of gearing connecting said generator with said power supply, a system of electrical distribution therefor embodying a plurality of series of storage batteries in circuit with the generator and in circuit with one another, switches interposed in the storage battery circuits, feed wires leading from said storage batteries, electrical means controlled by the potential of the generator at a predetermined degree for throwing said switches into position to close the storage battery circuits, and mechanical means controlled by the potential of the generator at degrees less than the degree of actuation of said electrical means for throwing said switches into position to break the storage battery circuit with the generator, one of said switches being adapted to close a circuit with the generator in both the make or break positions with relation to the generator and storage battery circuits.

12. In combination with a generator, a wind-mill power supply and gearing connecting the power shafts of the wind-mills with the power shaft of the generator, a system of electrical distribution from said generator embodying a series of storage batteries in circuit with the generator, switches interposed in the storage battery circuits, a safety device in circuit with the generator, a safety device controlling means, a safety device controlling means circuit, a switch interposed in said safety device controlling means circuit, means controlled by the safety device for decreasing the speed of the generator, means controlled by the potential of the generator for throwing said first named switches into position to close the storage battery circuits, and means for controlling said first named switches into position to break the storage battery circuits, one of said first named switches adapted to close a circuit with the generator in either its make or break position with relation to the storage battery circuits.

13. In combination with a generator, windmill power supply therefor, and a system of gearing connecting the power shafts of the wind-mills with the power shaft of the generator, a system of electrical distribution embodying a plurality of series of storage batteries in circuit with the generator, switches severally arranged in the storage battery circuits, a safety device in circuit with the generator and in circuit with the storage batteries, a safety device controlling means, a safety device controlling means circuit, a switch interposed in the circuit of said safety device controlling means, electrical means controlled by the potential of the generator for throwing said switches in position to close the storage battery circuits and to close the several circuits of the safety device whereby to decrease the speed of the generator, and mechanical means for tripping the several switches to the storage battery circuits whereby to break said circuits, one of said switches being adapted to be in circuit in both of its make and break positions with the generator.

14. In combination with the generator, and wind mill power supply therefor and systems of gearing connecting power shafts of the wind mills with the power shaft of the generator, electrical distribution therefor embodying a plurality of series of storage batteries in circuit with said generator, and a safety device controlling means in circuit with said generator, a series of contacts in said safety device circuit, and controlling a circuit with said storage batteries, feed wires leading from said storage batteries, switches interposed in the storage battery circuits, electrical means controlled by the potential of the generator for tripping said switches successively into position to close said storage battery and said safety device circuits, and mechanical means controlled by the potential of the generator for tripping said switches successively to break said storage battery circuits with the generator, one of said storage battery circuit switches being adapted to close a circuit with the generator in both its make and break position with relation to the storage battery circuit.

15. In combination with a generator, a source of wind-mill power supply therefor, and a system of gearing connecting the power shafts of the wind mills with the power shaft of the generator, a system of electrical distribution for said generator, embodying a plurality of storage batteries arranged in circuit with the generator, a safety device in circuit with the storage batteries, switches severally interposed in the storage battery circuits with the generator, means controlled by the safety device for decreasing the speed of the generator, a switch interposed in the storage battery circuit with the safety device embodying a motor in circuit with the generator, switch arms mounted upon the armature of said motor, a rheostat interposed in the storage battery circuit with the safety device, and stationary contacts, one of said switch arms being adapted to overlie said stationary contacts and the other of said switch arms being adapted to overlie said rheostat and to be moved thereupon by said motor as controlled by the potential of the generator whereby to close the circuit of the safety device.

16. In combination with a generator, a wind mill source of power supply and a system of gearing connecting the power shafts of the wind mills with the power shaft of the generator, a system of electrical distribution for said generator, embodying a plurality of storage batteries in circuit with the generator and with one another, a safety device for decreasing the speed of the generator in circuit with the storage batteries, said safety device embodying means for drawing the blades of the wind mills out of the wind, and automatic means operative upon violent continuous action of the wind for further stopping the action of the safety device, switches severally interposed in the storage battery circuits with the generator, a rheostat arranged in the circuit of the storage battery with the safety device, a switch arranged in said last named circuit and embodying a motor in circuit with the generator, stationary contacts, switch arms carried by the armature of said motor and adapted to have movement upon said rheostat and said stationary contacts with the motor as controlled by the potential from the generator whereby to establish a circuit of varying potential with the safety device and the storage batteries, electrical means controlled by the potential of the generator at a predetermined degree for successively tripping the several switches to close the various circuits, and mechanical means operative upon the action of the safety device and the deenergization of said electrical means for successively tripping the several switches to break the various circuits, one of said storage battery circuit switches being adapted to close a circuit with the generator in both its make and break positions with relation to the storage battery circuits.

17. In combination with a generator and wind-mill source of power supply, gearing connecting the power shaft with the power shaft of the generator, and a system of electrical distribution for said generator embodying storage batteries arranged in circuit with said generator, and switches severally interposed in the storage battery circuits with said generator and with one another, a safety device for decreasing the speed of the generator below a predetermined charging potential embodying a motor in circuit with the storage batteries, devices driven by said motor and connected to the blades of the wind mills for drawing said blades in position out of the wind, a rheostat arranged in the circuit of the storage batteries with said motor, a second motor in direct circuit with the generator and a switch embodying movable contact arms mounted upon the armature of said last named motor, and stationary contact members, said arms being adapted to move with said last named motor as controlled by the potential of said generator over said rheostat to said stationary contact members to establish a circuit of varying potential with said first named motor from said storage batteries, automatic means controlled by the movement of said first named motor for breaking the circuit thereof with the storage batteries, upon continuous charging action of said generator under the force of a violent wind, and electrical means controlled by the potential of said generator at a predetermined degree for successively tripping said storage battery and said safety device switches into position to close the various circuits, and mechanical means controlled by the potential of the generator at degrees less than the degree of actuation of said electrical means and operative after the action of said safety device and during the deenergization of said electrical means for successively tripping said switches into position to break the several circuits of the batteries with the generator and safety device, one of said storage battery switches being at all times adapted to close a circuit with the generator in either its make or break position with relation to said battery circuits.

18. In combination with a generator and source of power supply, storage batteries arranged in circuit with the generator, switches interposed in said storage battery circuits, and electrical means controlled by the potential of the generator at a predetermined time for successively tripping the several switches into position to close the circuits in the storage battery circuits with the generator and to permit of the charging of the storage batteries, a safety device adapted to decrease the speed of the generator below a predetermined charging potential, said safety device embodying a motor in circuit with said storage batteries, means driven by said motor for retarding the speed of the generator power supply, a rheostat arranged in said circuit from the storage batteries with said motor, and a switch for establishing said last named circuit embodying a motor in circuit with the generator, movable switch arms mounted upon said motor, and adapted to have movement therewith, and stationary contact members, said switch arms being adapted to overlie said rheostat and said contact members whereby to establish a circuit of varying potential between said storage batteries and said first named motor, said last named switch being also set in closed position by said electrical means and being adapted after the operation of the safety device to close a circuit from the storage battery with said first named motor and independent of said rheostat circuit whereby the current will enter said motor in an opposite direction from the current of the rheostat circuit to actuate said means for retarding action of the power supply so as to release said power supply to have free movement in driving the generator.

19. In combination with a generator and source of power supply, storage batteries arranged in circuit with the generator, switches interposed in said storage battery circuits, and electrical means controlled by the potential of the generator at a predetermined time for successively tripping the several switches into position to close the circuits of the storage batteries with the generator and to permit of the charging of the storage batteries, a safety device adapted to decrease the speed of the generator below a predetermined charging potential, said safety device embodying a motor in circuit with said storage batteries, means driven by said motor for retarding the speed of the generator power supply, a rheostat arranged in said circuit from the storage batteries with said motor, and a switch for establishing said last named circuit embodying a motor in circuit with the generator, movable switch arms mounted upon said motor, and adapted to have movement therewith, and stationary contact members, said switch arms being adapted to overlie said rheostat and said contact members whereby to establish a circuit of varying potential between said storage batteries and said first named motor, said last named switch being also set in closed position by said electrical means and being adapted after the operation of the safety device to close a circuit from the storage battery with said first named motor and independent of said rheostat circuit whereby the current will enter said motor in an opposite direction from the current of the rheostat circuit to actuate said means for retarding the action of the power supply so as to release said power supply to have free movement in driving the generator, and mechanical means operative after the action of the safety device and during the deënergization of said electrical means below the predetermined charging potential, for successively tripping said switches into a position, to break the respective circuits, one of said storage battery circuit switches being adapted at all times to close a circuit with the generator in its make and break positions with relation to the storage battery circuits with said generator.

In testimony whereof I affix my signature in the presence of two witnesses.

ADELBERT W. GRAY.

Witnesses:
K. H. BUTLER,
M. E. LAWSON.